US009648637B2

(12) United States Patent
Yang et al.

(10) Patent No.: US 9,648,637 B2
(45) Date of Patent: May 9, 2017

(54) METHOD FOR TRANSMITTING AND RECEIVING UPLINK SIGNAL, USER EQUIPMENT, AND BASE STATION

(71) Applicant: LG ELECTRONICS INC., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/333,943

(22) Filed: Oct. 25, 2016

(65) Prior Publication Data

US 2017/0041946 A1 Feb. 9, 2017

Related U.S. Application Data

(63) Continuation of application No. 14/125,478, filed as application No. PCT/KR2012/005131 on Jun. 28, 2012, now Pat. No. 9,491,740.
(Continued)

(51) Int. Cl.
*H04W 72/12* (2009.01)
*H04L 5/00* (2006.01)
(Continued)

(52) U.S. Cl.
CPC ......... *H04W 72/1294* (2013.01); *H04L 5/001* (2013.01); *H04L 5/0055* (2013.01); *H04W 72/0413* (2013.01); *H04W 74/0833* (2013.01)

(58) Field of Classification Search
CPC .............. H04L 27/2613; H04J 11/0073; H04J 11/0076; H04J 11/0079; H04J 2211/001
See application file for complete search history.

(56) References Cited

U.S. PATENT DOCUMENTS

2011/0086659 A1  4/2011  Yoon et al.
2011/0134774 A1  6/2011  Pelletier et al.
(Continued)

FOREIGN PATENT DOCUMENTS

KR  10-2010-0073992 A  7/2010
KR  10-2011-0040672 A  4/2011
(Continued)

OTHER PUBLICATIONS

Catt, "Consideration on TA Group," 3GPP TSG RAN WG2 Meeting #74, R2-112814, Barcelona, Spain, May 9-13, 2011, pp. 1-3.
(Continued)

*Primary Examiner* — Alvin Zhu
(74) *Attorney, Agent, or Firm* — Birch, Stewart, Kolasch & Birch, LLP

(57) ABSTRACT

A method and a base station for transmitting downlink data to a user equipment configured with a plurality of serving cells; and a method and a user equipment configured with a plurality of serving cells for receiving downlink data are discussed. The method for transmitting downlink data according to an embodiment includes transmitting a physical downlink control channel (PDCCH) carrying a downlink grant through a scheduling cell; and transmitting a physical downlink shared channel (PDSCH) carrying the downlink data through a scheduled cell. A primary cell (PCell) group is configured with a PCell and zero or more secondary cells (SCells), and an SCell group is configured with one or more SCells. The scheduled cell belongs to the PCell group when the scheduling cell belongs to the PCell group, and the scheduled cell belongs to the SCell group when the scheduled cell belongs to the SCell group.

18 Claims, 9 Drawing Sheets

Related U.S. Application Data

(60) Provisional application No. 61/501,786, filed on Jun. 28, 2011.

(51) Int. Cl.
*H04W 72/04* (2009.01)
*H04W 74/08* (2009.01)

(56) References Cited

U.S. PATENT DOCUMENTS

| | | |
|---|---|---|
| 2011/0261776 A1 | 10/2011 | Ahn et al. |
| 2012/0087254 A1 | 4/2012 | Yin et al. |
| 2012/0113827 A1 | 5/2012 | Yamada et al. |
| 2012/0127950 A1 | 5/2012 | Chung et al. |
| 2012/0140708 A1 | 6/2012 | Choudhury et al. |

FOREIGN PATENT DOCUMENTS

| | | |
|---|---|---|
| WO | WO 2010/074500 A2 | 7/2010 |
| WO | WO 2011/021830 A2 | 2/2011 |

OTHER PUBLICATIONS

LG Electronics, "ACK/NACK on PUCCH for TDD," 3GPP TSG RAN WG1 Meeting #63, R1-106099, Jacksonville, USA, Nov. 15-19, 2010, pp. 1-14.

QUALCOMM Incorporated, "Clarification of parallel PUCCH and PUSCH transmission," 3GPP TSG-RAN WG1 #65, R1-111803, Barcelona, Spain, May 9-13, 2011, pp. 1-4.

Samsung, "Periodic CQI/PMI/RI Reporting with CA," 3GPP TSG RAN WG1 #63, R1-106015, Jacksonville, USA, Nov. 15-19, 2010, pp. 1-4.

METHOD FOR TRANSMITTING AND RECEIVING UPLINK SIGNAL, USER EQUIPMENT, AND BASE STATION

CROSS-REFERENCE TO RELATED APPLICATIONS

This Application is a Continuation of co-pending U.S. patent application Ser. No. 14/125,478 filed on Dec. 11, 2013, which is filed as the National Phase of PCT/KR2012/005131 filed on Jun. 28, 2012, which claims the benefit under 35 U.S.C. §119(e) to U.S. Provisional Application No. 61/501,786 filed on Jun. 28, 2011, all of which are hereby expressly incorporated by reference into the present application.

BACKGROUND OF THE INVENTION

Field of the Invention

The present invention relates to a wireless communication system. More particularly, the present invention provides a method and apparatus for more effectively transmitting/receiving an uplink/downlink signal in a carrier aggregation environment in which a plurality of cells is configured.

Discussion of the Related Art

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). A base station (BS) and a user equipment (UE) transmit and receive data and/or control information scheduled on a prescribed time unit basis, i.e. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe.

Meanwhile, to use a wider frequency band in recent wireless communication systems, introduction of carrier aggregation (or bandwidth aggregation) technology that uses a wider UL/DL bandwidth by aggregating a plurality of UL/DL frequency blocks has been discussed.

FIG. 1 illustrates an example of performing communication in a multicarrier environment.

A multicarrier system or carrier aggregation (CA) system refers to a system for supporting a wide bandwidth by aggregating a plurality of carriers each having a narrower bandwidth than a target bandwidth. A CA system is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. When a plurality of carriers each having a narrower bandwidth than a target bandwidth is aggregated, the bandwidth of each of the aggregated carriers may be limited to a bandwidth used in a legacy system in order to ensure backward compatibility with the legacy system. For example, the legacy LTE system supports bandwidths of 1.4, 3, 5, 10, 15, and 20 MHz and an LTE-Advanced (LTE-A) system evolved from the LTE system may support a bandwidth wider than 20 MHz using only bandwidths supported in the LTE system. Alternatively, CA may be supported by defining a new bandwidth irrespective of the bandwidths used in the legacy system. The term multicarrier is used interchangeably with the term CA or bandwidth aggregation. Contiguous CA and non-contiguous CA are collectively referred to as CA. For reference, when only one component carrier (CC) is used for communication in TDD or when only one UL CC and one DL CC are used for communication in FDD, this corresponds to single carrier communication (non-CA).

SUMMARY OF THE INVENTION

In a multi-carrier aggregation environment in which a plurality of carriers is aggregated to be used in communication between a BS and a UE, a communication method using a single carrier cannot be applied to communication using multiple carriers. A new communication method suitable for communication using multiple carriers while minimizing influence on a legacy system should be defined.

The technical objects that can be achieved through the present invention are not limited to what has been particularly described hereinabove and other technical objects not described herein will be more clearly understood by persons skilled in the art from the following detailed description.

According to an aspect of the present invention, provided herein is a method for transmitting, by a user equipment configured with a plurality of cells, an uplink signal to a base station. The method comprises: configuring a primary cell (PCell) group including at least a PCell among the plurality of cells and a secondary cell (SCell) group including one or more SCells among the plurality of cells; and transmitting uplink control information regarding the SCell group to the base station on a physical uplink control channel (PUCCH) or a physical uplink shared channel (PUSCH), wherein the PUCCH is transmitted to the base station using an SCell configured as an anchor SCell among the one or more SCells of the SCell group and the PUSCH is transmitted to the base station using one SCell among the one or more SCells of the SCell group.

In another aspect of the present invention, provided herein is a user equipment for transmitting an uplink signal to a base station, wherein the user equipment is configured with a plurality of cells. The user equipment comprises: a radio frequency (RF) unit; and a processor configured to control the RF unit, wherein the processor configures a primary cell (PCell) group including at least a PCell among the plurality of cells and a secondary cell (SCell) group including one or more SCells among the plurality of cells and controls the RF unit to transmit uplink control information regarding the SCell group to the base station on a physical uplink control channel (PUCCH) or a physical uplink shared channel (PUSCH), and wherein the PUCCH is transmitted to the base station using an SCell configured as an anchor SCell among the one or more SCells of the SCell group and the PUSCH is transmitted to the base station using one SCell among the one or more SCells of the SCell group.

In another aspect of the present invention, provided herein is a method for transmitting, by a user equipment configured with a plurality of cells, an uplink signal to a base station. The method comprises: configuring a primary cell (PCell) group including at least a PCell among the plurality of cells and a secondary cell (SCell) group including one or more SCells among the plurality of cells; and receiving uplink control information regarding the SCell group from the user equipment on a physical uplink control channel (PUCCH) or a physical uplink shared channel (PUSCH), wherein the PUCCH is received from the user equipment using an SCell configured as an anchor SCell among the one or more SCells of the SCell group and the PUSCH is received from the user equipment using one SCell among the one or more SCells of the SCell group.

In another aspect of the present invention, provided herein is a user equipment for transmitting an uplink signal to a base station, wherein the user equipment is configured with a plurality of cells. The user equipment comprises: a radio frequency (RF) unit; and a processor configured to control the RF unit, wherein the processor configures a primary cell (PCell) group including at least a PCell among the plurality of cells and a secondary cell (SCell) group including one or more SCells among the plurality of cells and controls the RF unit to receive uplink control information regarding the SCell group from the user equipment on a physical uplink control channel (PUCCH) or a physical uplink shared channel (PUSCH), and wherein the PUCCH is received from the user equipment using an SCell configured as an anchor SCell among the one or more SCells of the SCell group and the PUSCH is received from the user equipment using one SCell among the one or more SCells of the SCell group.

In each aspect of the present invention, if a transmission timing of the PUCCH using the anchor SCell in the SCell group collides with a transmission timing of the PUSCH using one SCell in the SCell group, the uplink control information regarding the SCell group may be transmitted to the base station from the user equipment on the PUSCH.

In each aspect of the present invention, if the uplink control information regarding the SCell group is acknowledgement/negative acknowledgement (ACK/NACK) information regarding the anchor SCell in the SCell group, the PUCCH may be transmitted to the base station from the user equipment using a PUCCH resource associated with a control channel element (CCE) of a physical downlink control channel (PDCCH) received using the anchor SCell among PUCCH resources reserved for the anchor SCell.

In each aspect of the present invention, a physical downlink control channel (PDCCH) for the SCell group may be received from the base station and, if the PDCCH carries a downlink grant for the anchor SCell, transmit power of the PUCCH may be determined based on transmit power control (TPC) information in the PDCCH and, if the PDCCH carries a downlink grant for an SCell other than the anchor SCell among the one or more SCells, a PUCCH resource for transmitting/receiving acknowledgement/negative acknowledgement (ACK/NACK) information regarding the SCell group may be determined based on the TPC information.

In each aspect of the present invention, the anchor SCell may be used to transmit/receive a physical downlink control channel (PDCCH) carrying an uplink grant or a downlink grant for at least one SCell in the SCell group.

The above technical solutions are merely some parts of the embodiments of the present invention and various embodiments into which the technical features of the present invention are incorporated can be derived and understood by persons skilled in the art from the following detailed description of the present invention.

According to the present invention, UL carriers on which a UE and a BS operate in different frequencies and/or UL carrier(s) on which the UE and the BS operate in a frequency using antennas of different locations can be aggregated.

According to the present invention, a plurality of time synchronizations can be efficiently managed with respect to one UE.

According to the present invention, different time synchronizations can be applied to UL CCs having different frequency characteristics.

According to the present invention, DL/UL control information can be efficiently transmitted/received in a CA environment and a cross-carrier scheduling environment.

Effects according to the present invention are not limited to what has been particularly described hereinabove and other advantages not described herein will be more clearly understood by persons skilled in the art from the following detailed description of the present invention.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE EMBODIMENTS

Figure 1:
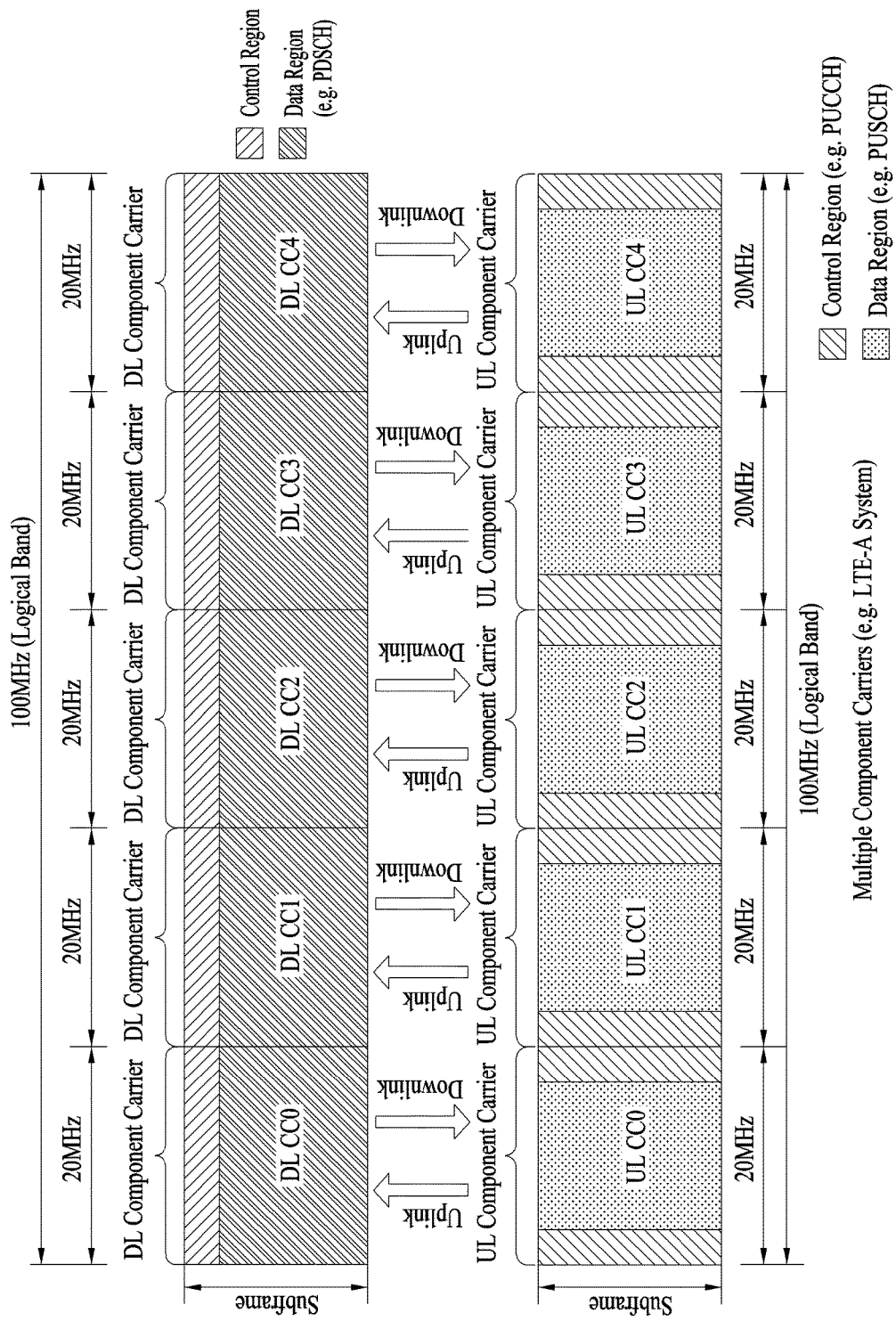
FIG. 1 illustrates an example of performing communication in a multicarrier environment.

The following embodiments are combinations of elements and features of the present invention in a predetermined form. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In some instances, well-known structures and devices may be omitted in order to avoid obscuring the concepts of the present invention and the important functions of the structures and devices may be shown in block diagram form. The same reference numbers will be used throughout the drawings to refer to the same or like parts.

The following technique can be used for a variety of radio access systems, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3rd generation partnership project (3GPP) long term evolution (LTE) is part of evolved UMTS (E-UMTS) using E-UTRA. 3GPP LTE employs OFDMA in DL and employs SC-FDMA in UL. LTE-advanced (LTE-A) is an evolved version of 3GPP LTE. WiMAX can be explained by IEEE 802.16e (WirelessMAN-OFDMA reference system) and advanced IEEE 802.16m (WirelessMAN-OFDMA advanced system). For clarity, the following description focuses on 3GPP LTE(-A) standards. However, technical features of the present invention are not limited thereto.

The embodiments of the present invention can be supported by standard documents disclosed in at least one of wireless access systems including an IEEE 802 system, a 3GPP system, a 3GPP LTE system, a 3GPP LTE-A system, and a 3GPP2 system. In particular, steps or parts, which are not described to clearly reveal the technical idea of the present invention, in the embodiments of the present invention may be supported by the above documents. All terminology used herein may be supported by the above-mentioned documents.

Specific terms used in the following description are proposed to aid in understanding the present invention, and the use of these specific terms may be changed to another format within the technical scope or spirit of the present invention.

In the embodiments of the present invention, a description is given of a data transmission and reception relationship between a base station (BS) and a user equipment (UE). Here, the 'base station (BS)' refers to a terminal node of a network communicating directly with the UE. The BS exchanges data and control information by communicating with the UE. In some cases, a specific operation described as being performed by the BS in this specification may be performed by an upper node of the BS. In other words, it is apparent that, in a network comprised of a plurality of network nodes including the BS, various operations performed for communication with the UE may be performed by the BS, or network nodes other than the BS. The term 'base station (BS)' may be replaced with terms such as fixed station, Node B, eNode B (eNB), access point (AP), etc. The 'user equipment (UE)' may be fixed or may have mobility. Examples of the UE include various devices that transmit and receive user data and/or various kinds of control information to and from a BS. The term 'user equipment (UE)' may be replaced with terms such as terminal, mobile station (MS), mobile subscriber station (MSS), subscriber station (SS), etc.

In the present invention, a physical downlink control channel (PDCCH) and a physical downlink shared channel (PDSCH) refer to a set of time-frequency resources or resource elements (REs) carrying downlink control information (DCI) and a set of time-frequency resources or REs carrying DL data, respectively. In addition, a physical uplink control channel (PUCCH), a physical uplink shared channel (PUSCH), and a physical random access channel (PRACH) refer to a set of time-frequency resources or REs carrying uplink control information (UCI), a set of time-frequency resources or REs carrying uplink data, and a set of time-frequency resources or REs carrying a random access signal, respectively. In the present invention, PUCCH/PUSCH/PRACH transmission of a UE is conceptually identical to UCI/UL data/random access signal transmission on PUSCH/PUCCH/PRACH, respectively. In addition, PDCCH/ PDSCH transmission of a BS is conceptually identical to DL data/DCI transmission on PDCCH/PDSCH, respectively.

Figure 2:
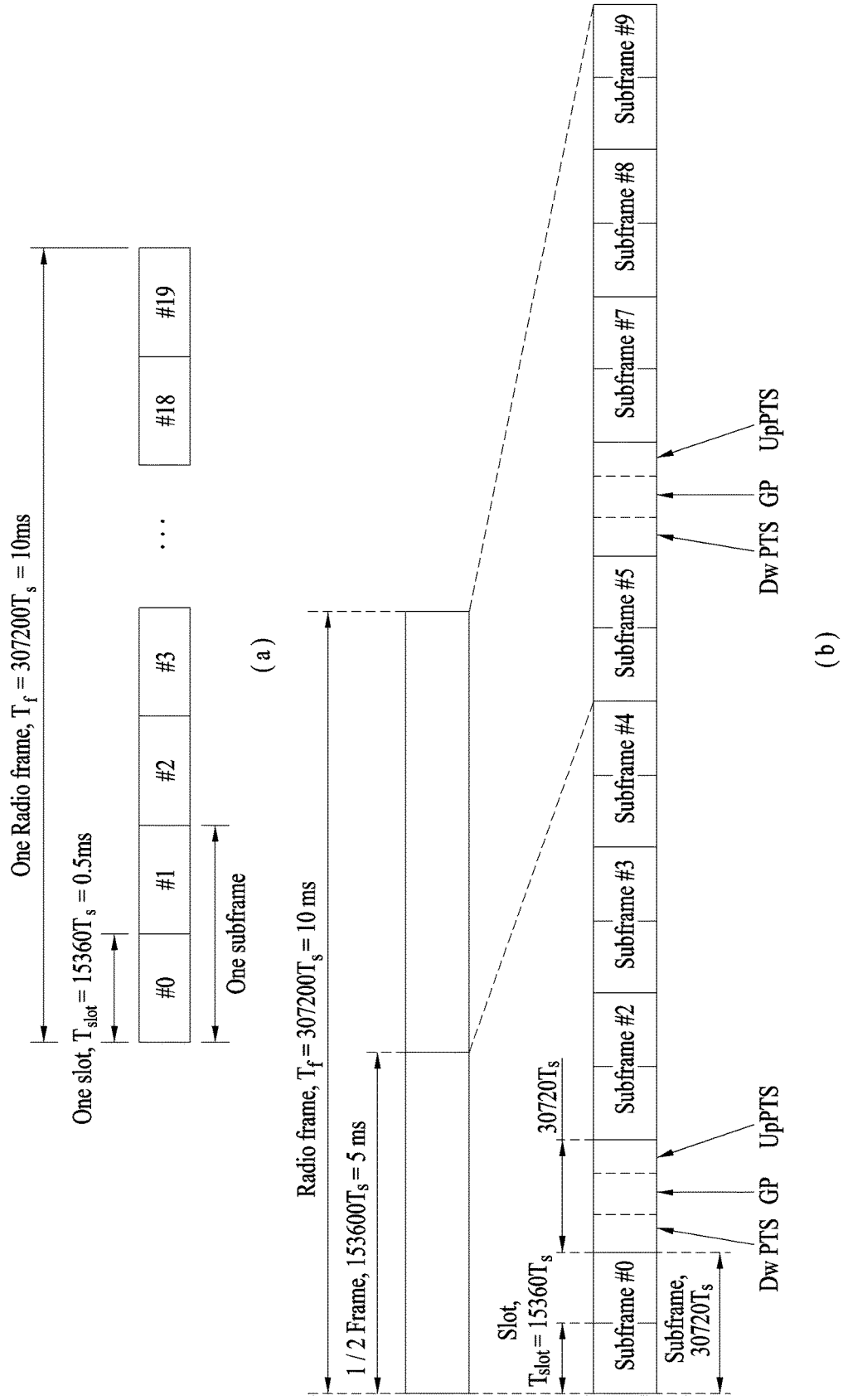
FIG. 2 illustrates the structure of a radio frame used in a wireless communication system.

FIG. 2 illustrates the structure of a radio frame used in a wireless communication system. Specifically, FIG. 2(a) illustrates an exemplary structure of a radio frame which can be used in FDD in 3GPP LTE(-A) and FIG. 2(b) illustrates an exemplary structure of a radio frame which can be used in TDD in 3GPP LTE(-A).

Referring to FIG. 2, a 3GPP LTE(-A) radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by radio frame number (or radio frame index), subframe number (or subframe index), slot number (or slot index), and the like.

A radio frame may have different configurations according to duplex mode. In FDD mode for example, since DL transmission and UL transmission are discriminated according to frequency, a radio frame for a specific frequency band operating on a prescribed carrier frequency includes either DL subframes or UL subframes. In TDD mode, since DL transmission and UL transmission are discriminated according to time, a radio frame for a specific frequency band operating on a prescribed carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. a downlink pilot time slot (DwPTS), a guard period (GP), and an uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTSee | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
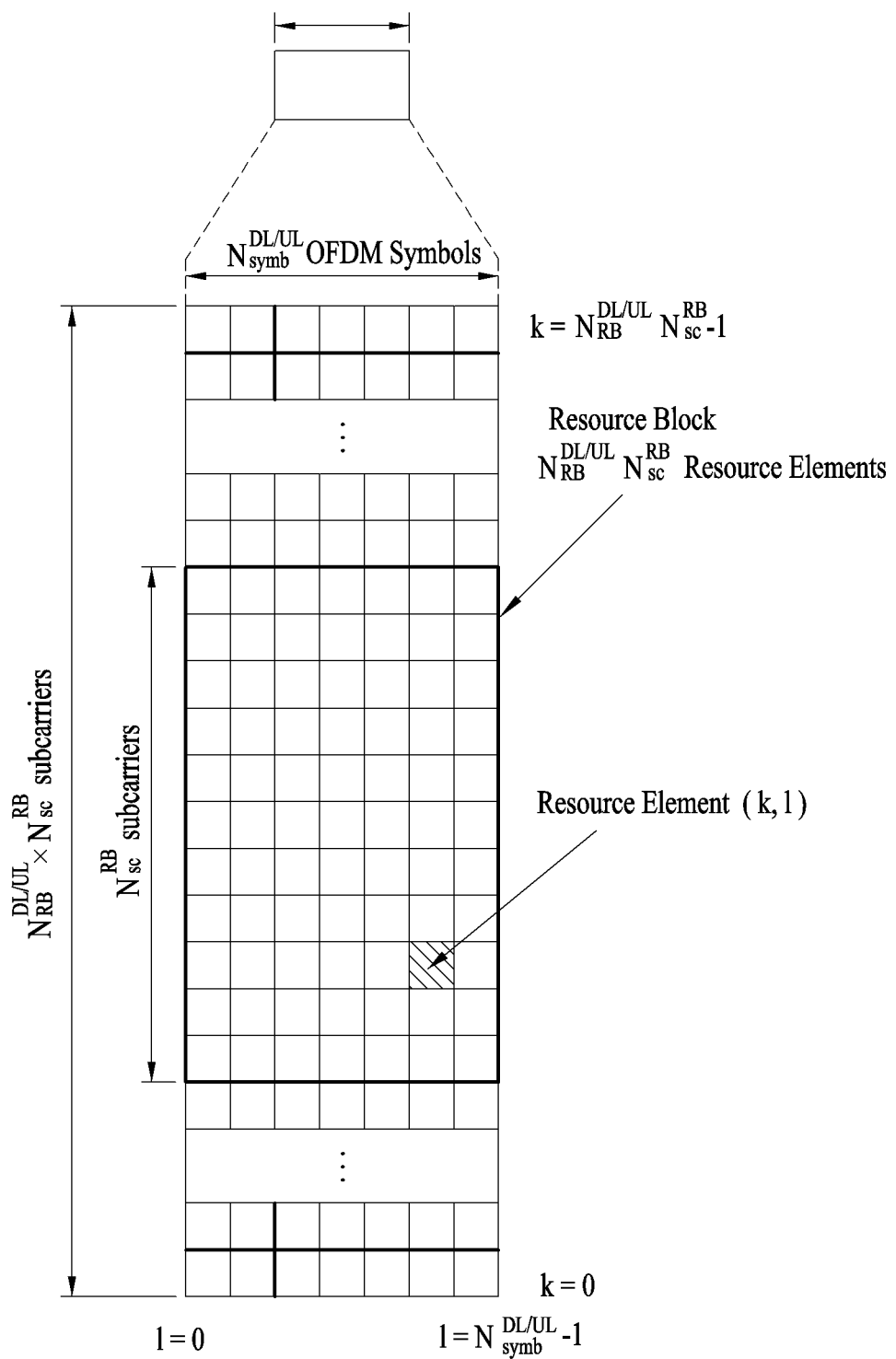
FIG. 3 illustrates the structure of a downlink (DL)/uplink (UL) slot in a wireless communication system.

FIG. 3 illustrates the structure of a DL/UL slot structure in a wireless communication system. In particular, FIG. 3 illustrates the structure of a resource grid of a 3GPP LTE(-A) system. One resource grid exists per antenna port.

Referring to FIG. 3, a slot includes a plurality of OFDM symbols in the time domain and includes a plurality of resource blocks (RBs) in the frequency domain. The OFDM symbol may refer to one symbol duration. Referring to FIG. 3, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend upon DL transmission bandwidth and UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to a multiple access scheme. The number of OFDM symbols included in one slot may be varied according to channel bandwidth and CP length. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 3 for convenience of description, embodiments of the present invention are similarly applicable to subframes having a different number of OFDM symbols. Referring to FIG. 3, each OFDM symbol includes $N^{DL/UL}_{RB} * N^{RB}_{sc}$ subcarriers in the frequency domain. The type of subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

In one subframe, two RBs, each located in each of two slots of the subframe while occupying the same $N^{RB}_{sc}$ consecutive subcarriers, are referred to as a physical resource block (PRB) pair. Two RBs configuring a PRB pair have the same PRB number (or the same PRB index).

Figure 4:
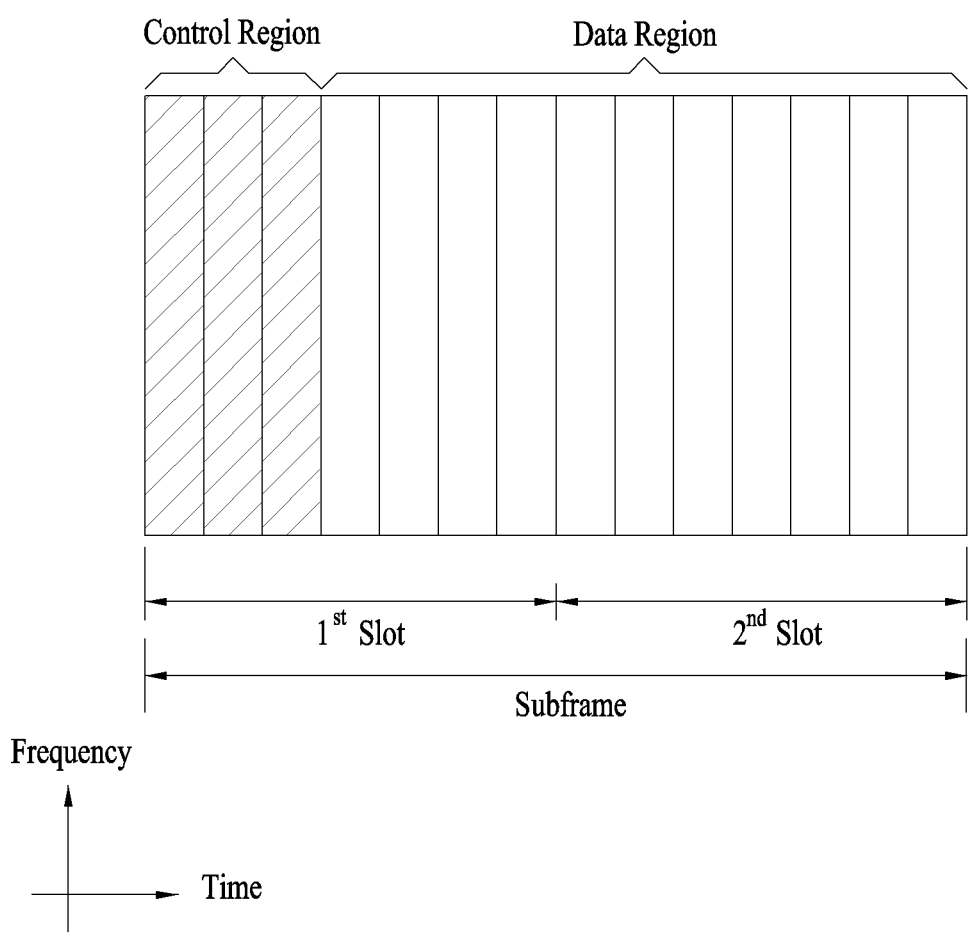
FIG. 4 illustrates the structure of a DL subframe used in a 3GPP LTE(-A) system.

FIG. 4 illustrates the structure of a DL subframe used in a 3GPP LTE(-A) system.

Referring to FIG. 4, a DL subframe is divided into a control region and a data region in the time domain. Referring to FIG. 4, a maximum of 3 (or 4) OFDM symbols located in a front part of a first slot of a subframe correspond to the control region. Hereinafter, a resource region usable for PDCCH transmission in the DL subframe is referred to as a PDCCH region. OFDM symbols other than the OFDM symbol(s) used in the control region correspond to the data region to which a PDSCH is allocated. Hereinafter, a resource region usable for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols used for transmission of a control channel within a subframe. The PHICH carries a hybrid automatic repeat request (HARQ) acknowledgement/negative-acknowledgement (ACK/NACK) signal as a response to UL transmission.

Control information transmitted via a PDCCH is referred to as downlink control information (DCI). The DCI includes resource allocation information for a UE or a UE group and other control information. For example, the DCI includes transmission format and resource allocation information of a DL shared channel (DL-SCH) (hereinafter, DL grant), transmission format and resource allocation information of a UL shared channel (UL-SCH) (hereinafter, UL grant), paging information on a paging channel (PCH), system information on the DL-SCH, resource allocation information of a higher-layer control message such as a random access response transmitted on a PDSCH, a transmit (Tx) power control command set of individual UEs in a UE group, a Tx power control command, activation indication information of voice over IP (VoIP), a downlink assignment index (DAI), etc. A PDCCH is transmitted on an aggregate of one or plural consecutive control channel elements (CCEs). A CCE is a logical assignment unit used to provide coding rate based on a radio channel state to the PDCCH. The CCE corresponds to a plurality of resource element groups (REGs). For example, one CCE corresponds to 9 REGs and one REG corresponds to 4 REs.

The BS may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of DCI transmitted on one PDCCH may vary according to DCI format and the size of the DCI may vary according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

A plurality of PDCCHs may be transmitted in the control region. A UE may monitor the plurality of PDCCHs to detect a PDCCH thereof. Basically, the UE does not know the location at which a PDCCH thereof is transmitted. Therefore, the UE performs blind detection (also referred to as blind decoding) for all PDCCHs of a corresponding DCI format in every subframe until a PDCCH having an identifier thereof is received.

Figure 5:
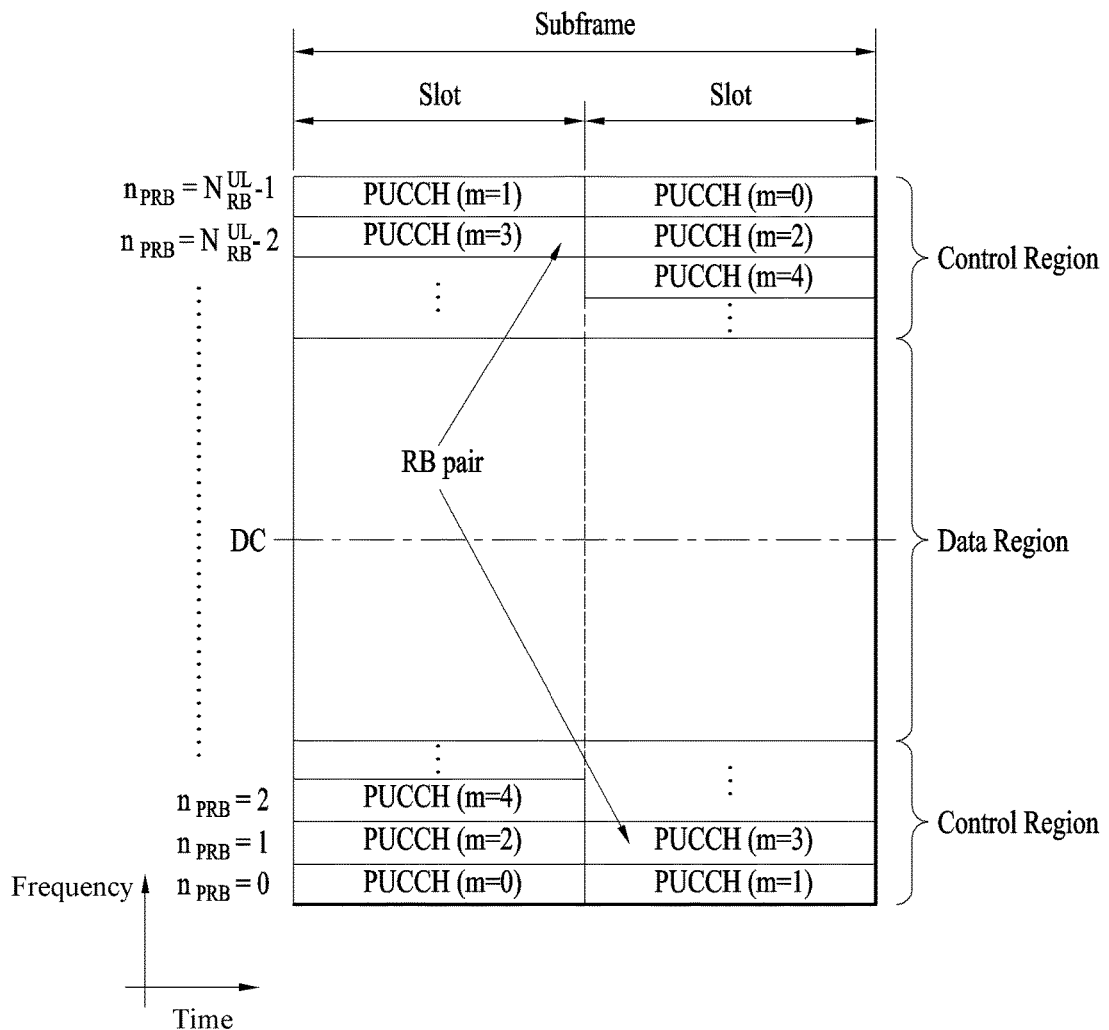
FIG. 5 illustrates the structure of a UL subframe used in a 3GPP LTE(-A) system.

FIG. 5 illustrates the structure of a UL subframe used in a 3GPP LTE(-A) system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted on a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of the PUCCH and the PUSCH may be indicated by higher layers.

In the UL subframe, subcarriers distant from a direct current (DC) subcarrier are used as the control region. In other words, subcarriers located at both ends of a UL transmission bandwidth are used to transmit UL control information such as ACK/NACK for DL data, channel state information for DL (e.g. a channel quality indicator (CQI), a precoding matrix index (PMI), a rank indicator (RI), etc.), and a scheduling request (SR). A DC subcarrier is a component unused for signal transmission and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The size and usage of UCI carried by one PUCCH may be changed according to PUCCH format and the size of the UCI may be changed according to coding rate. A UE is assigned PUCCH resources for UCI transmission by a BS through a higher layer signal, a dynamic control signal, or an implicit scheme. Physical resources used for a PUCCH depend upon two parameters, $N^{(2)}_{RB}$ and $N^{(1)}_{CS}$, given by higher layers. The parameter $N^{(2)}_{RB}$, which is equal to or greater than 0 ($N^{(2)}_{RB} \geq 0$), indicates available bandwidth for PUCCH format 2/2a/2b transmission in each slot and is expressed as an integer multiple of $N^{RB}_{SC}$. The parameter $N^{(1)}_{CS}$ indicates the number of cyclic shifts used for PUCCH format 1/1a/1b in an RB used for a mixture of formats 1/1a/1b and 2/2a/2b. A value of $N^{(1)}_{CS}$ is an integer multiple of $\Delta^{PUCCH}_{shift}$ within a range of $\{0, 1, \ldots, 7\}$. $\Delta^{PUCCH}_{shift}$ provided by higher layers. If $N^{(1)}_{CS}$ is 0, no mixed RBs are present. In each slot, at most one RB supports a mixture of PUCCH format 1/1a/1b and PUCCH format 2/2a/2b. Resources used for transmission of PUCCH format 1/1a/1b, PUCCH format 2/2a/2b, and PUCCH format 3 by an antenna port p are expressed by $n^{(1,p)}_{PUCCH}$, $n^{(2,p)}_{PUCCH}$ <$N^{(2)}_{RB} N^{RB}_{sc}$+ceil($N^{(1)}_{cs}/8$)·($N^{RB}_{sc}-N^{(1)}_{cs}-2$), and $n^{(3,p)}_{PUCCH}$, respectively, which are indexes of non-negative integers. More specifically, according to a specific rule predefined for each PUCCH format, an orthogonal sequence and/or a cyclic shift, to be applied to UCI from PUCCH resource indexes, are determined and resource indexes of two RBs in a subframe, to which a PUCCH is to be mapped, are provided.

For example, a resource for PUCCH format 1a/1b used for transmission of ACK/NACK information for a PDCCH or a PDSCH associated with the PDCCH is implicitly allocated. An index of the PUCCH resource for PUCCH format 1a/1b is determined by linkage with a specific CCE index (e.g. lowest CCE index $n_{CCE}$) among indexes of CCEs used for transmission of the PDCCH. For instance, in a 3GPP LTE(-A) system, indexes of PUCCH format 1a/1b resources for transmission by two antenna ports $p_0$ and $p_1$ are determined as follows.

$$n_{PUCCH}^{(1,\tilde{p}=p0)}=n_{CCE}+N_{PUCCH}^{(1)} \qquad \text{[Equation 1]}$$

$$n_{PUCCH}^{(1,\tilde{p}=p0)}=n_{CCE}+1+N_{PUCCH}^{(1)} \qquad \text{[Equation 2]}$$

Here, $n^{(1,\tilde{p}=p0)}_{PUCCH}$ denotes an index (i.e. number) of a PUCCH resource to be used by antenna port $p_0$, $n^{(1,\tilde{p}=p1)}_{PUCCH}$ denotes an index of a PUCCH resource index to be used by antenna port $p_1$, and $N^{(1)}_{PUCCH}$ denotes a signaling value received from higher layers. $n_{CCE}$ is the lowest CCE index used for PDCCH transmission.

Meanwhile, as described with reference to FIG. 1, CA or bandwidth aggregation technology has recently been discussed. For example, referring to FIG. 1, five CCs, each of 20 MHz, may be aggregated on each of UL and DL to support a bandwidth of 100 MHz. The respective CCs may be contiguous or non-contiguous in the frequency domain. An Evolved Universal Terrestrial Radio Access (E-UTRA) operating band of Table 3 may be used for, but not limited to, CA.

TABLE 3

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-[1447.9] MHz | 1475.9 MHz-[1495.9] MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 22 | [3410] MHz-[3500] MHz | [3510] MHz-[3600] MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| [41] | [3400] MHz-[3600] MHz | [3400] MHz-[3600] MHz | TDD |

Note
[1]Band 6 is not applicable.

For convenience, FIG. 1 shows the case in which the bandwidth of a UL CC is the same as the bandwidth of a DL CC and the two are symmetrical. However, the bandwidth of each CC may be independently determined. It is also possible to configure asymmetric CA in which the number of UL CCs is different from the number of DL CCs. A UL CC and a DL CC may also be referred to as UL resources and DL resources, respectively. Even when a BS manages X DL CCs, a frequency bandwidth which can be received by a specific UE may be limited to Y (≤X) DL CCs. In this case, the UE needs to monitor DL signals/data transmitted through the Y CCs. In addition, even when the BS manages L UL CCs, a frequency bandwidth that can be received by a specific UE may be limited to M (≤L) UL CCs. The limited DL/UL CCs for a specific UE are referred to as serving UL/DL CCs configured in the specific UE. The BS may allocate a prescribed number of CCs to the UE by activating some or all of the CCs managed by the BS or by deactivating some CCs managed by the BS. The BS may change the activated/deactivated CCs and change the number of activated/deactivated CCs. Various parameters for CA may be configured cell-specifically, UE group-specifically, or UE-specifically. Once the BS allocates available CCs to the UE cell-specifically or UE-specifically, at least one of the allocated CCs is not deactivated, unless overall CC allocation to the UE is reconfigured or the UE is handed over. Hereinafter, the CC that is not deactivated unless overall CC allocation to the UE is reconfigured is referred to as a primary CC (PCC) and a CC that the BS can freely activate/deactivate is referred to as a secondary CC (SCC). Single carrier communication uses one PCC for communication between the UE and the BS and does not use the SCC for communication.

Figure 6:
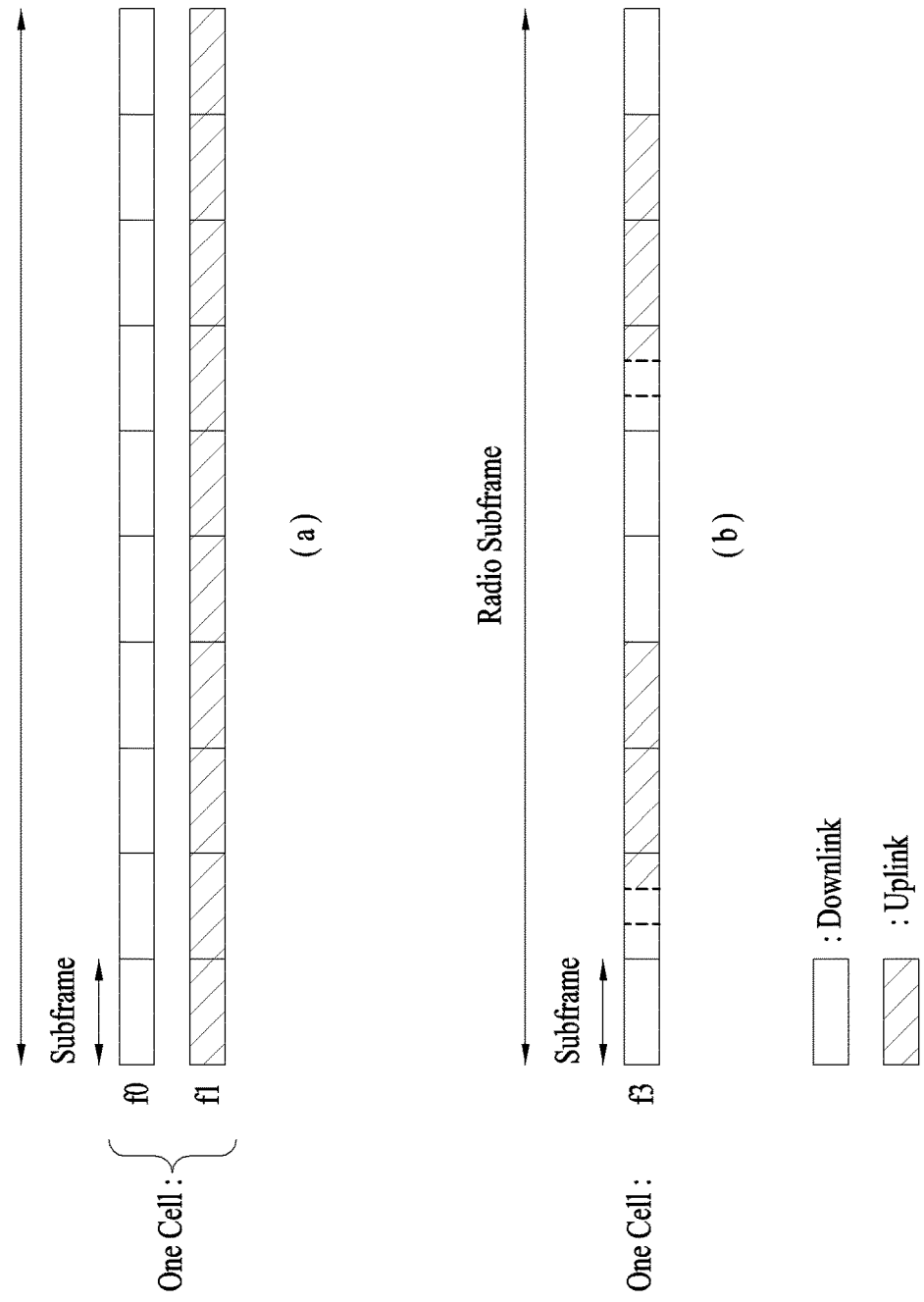
FIG. 6 is a diagram explaining the meaning of a cell in 3GPP LTE(-A).

Meanwhile, 3GPP LTE(-A) uses the concept of cells to manage radio resources. FIG. 6 is a view explaining the meaning of a cell in 3GPP LTE(-A).

A cell is defined as a combination of DL resources and UL resources, that is, a combination of a DL CC and a UL CC. The cell can be configured of DL resources alone, or of both DL resources and UL resources. When CA is supported, a linkage between a carrier frequency of the DL resources (or DL CC) and a carrier frequency of the UL resources (or UL CC) may be indicated by system information. For example, a combination of the DL resources and the UL resources may be indicated by a system information block type 2 (SIB2) linkage.

Referring to FIG. 6(a), for FDD, a UL operating band and a DL operating band are different. Therefore, for FDD, different carrier frequencies are linked to constitute one cell and the SIB2 linkage indicates a frequency of a UL CC using a frequency different from a frequency of a DL CC accessed by the UE. In other words, in the case of FDD, a DL CC constituting one cell and a UL CC linked with the DL CC operate on different frequencies.

Referring to FIG. 6(b), for TDD, a UL operating band and a DL operating band are the same. Therefore, one carrier frequency constitutes one cell and the SIB2 linkage indicates a frequency of a UL CC using the same frequency as a frequency of a DL CC accessed by the UE. In other words, in the case of TDD, a DL CC constituting one cell and a UL CC linked with the DL CC operate on the same frequency.

Here, the carrier frequency refers to a center frequency of each cell or CC. A cell that operates on a primary frequency (or PCC) may be referred to as a primary cell (PCell) or PCC and a cell that operates on a secondary frequency (or SCC)

may be referred to as a secondary cell (SCell) or SCC. A PCell refers to a cell used for the UE to perform an initial connection establishment or connection re-establishment procedure. The PCell may also refer to a cell indicated in a handover procedure. As another example, the PCell may also refer to a DL CC on which the UE receives a DL synchronization signal (SS) to acquire initial synchronization and a UL CC linked with the DL CC. A carrier corresponding to the PCell in DL is referred to as a DL primary CC (DL PCC) and a carrier corresponding to PCell in UL is referred to as a UL primary CC (UL PCC). An SCell refers to a cell which can be configured after radio resource control (RRC) connection establishment and can be used to provide additional radio resources. According to capabilities of the UE, the SCell may form a set of serving cells for the UE together with PCell. The serving cell may be referred to as a serving CC. A carrier corresponding to the SCell in DL is referred to as a DL secondary CC (DL SCC) and a carrier corresponding to the SCell in UL is referred to as a UL secondary CC (UL SCC). For a UE in an RRC_CONNECTED state, for which CA is not configured or CA is not supported, only one serving cell comprised of only a PCell is present. Meanwhile, for a UE in an RRC_CONNECTED state, for which CA is configured, one or more serving cells may be present and the one or more serving cells may include one PCell and one or more SCells. For CA, a network may configure a UE that supports CA by adding one or more SCells to a PCell initially configured in the connection establishment procedure after an initial security activation procedure is initiated. However, even if the UE supports CA, the network may configure only the PCell for the UE, without adding the SCells.

Hereinafter, a cell used for a UE to perform an initial connection establishment or connection re-establishment procedure with a network of a BS, a cell indicated in a handover procedure, or a cell with which initial DL synchronization is acquired is referred to as a PCC and the other cells are referred to as SCCs. The PCC may be referred to as an anchor CC or a primary carrier and the SCC may be referred to as an SCell or a secondary CC.

According to current discussion about a 3GPP LTE(-A) system, specific control information may be transmitted/received only through a specific CC. In other words, 3GPP LTE(-A) up to now has specified that the PCC is in charge of DL control signaling, associated with system information (SI) and with common control information (CCI) transmitted/received through a common search space and in charge of UL control signaling, associated with uplink control information (UCI) including acknowledgement (ACK)/negative ACK (NACK) for DL data, a channel quality indicator (CQI), etc. In terms of DL, the SI is transmitted/received using only the PCC and the UE applies SI acquisition only on the PCC. In addition, non-access stratum (NAS) mobility information is transmitted/received only on the PCC. Further, the common search space, in which all UEs within a coverage area of a corresponding BS attempt to perform blind detection to detect a PDCCH, is present only on the PCC. In terms of UL, current 3GPP LTE(-A) specifies that UCI carried by a PUCCH should always be transmitted/received using the PCC. Accordingly, if the PCC is configured for the UE, the UE can transmit the PUCCH only on the PCC.

Meanwhile, in the case of communication using a single carrier, only one serving cell is present and thus a PDCCH carrying a UL/DL grant and a PUSCH/PDSCH corresponding to the PDCCH are transmitted in the same cell. In other words, in the case of FDD in a single-carrier environment, a PDCCH for a DL grant with respect to a PDSCH to be transmitted on a specific DL CC is transmitted on the specific CC and a PDCCH for a UL grant with respect to a PUSCH to be transmitted on a specific UL CC is transmitted on a DL CC linked to the specific UL CC. In contrast, in a multi-carrier system, since a plurality of serving cells may be configured, transmission of the UL/DL grant on a serving cell having a good channel state may be permitted. Thus, if a cell in which the UL/DL grant, which is scheduling information, is carried is different from a cell in which UL/DL transmission corresponding to the UL/DL grant is performed, this is called cross-carrier scheduling. 3GPP LTE(-A) may support an aggregate of plural CCs and support a cross-carrier scheduling operation based on the aggregated CCs, for improvement of data transmission rate and stable control signaling. For cross-carrier scheduling, a carrier indicator field (CIF) may be introduced. Whether the CIF is present or not in a PDCCH may be semi-statically and UE-specifically (or UE group-specifically) configured by higher layer signaling (e.g. RRC signaling).

One or more scheduling CCs may be configured per UE. A scheduling CC set may be configured UE-specifically, UE group-specifically, or cell-specifically. The scheduling CC may be configured to directly schedule at least itself. That is, the scheduling CC may be a scheduled CC thereof. Only one scheduling CC per scheduled CC may be configured. In other words, a plurality of scheduling CCs cannot be configured with respect to one scheduled CC. In the present invention, a CC which carries a PDCCH is referred to as a scheduling CC, a monitoring CC, or an MCC and a CC which carries a PDSCH/PUSCH scheduled by the PDCCH is referred to as a scheduled CC. The scheduling CC includes a DL CC as a portion of aggregated DL CCs. A UE detects/decodes the PDCCH only on the DL CC. That is, during cross-carrier scheduling, DL/UL grant PDCCHs for scheduling PDSCHs/PUSCHs of the scheduling CC and the scheduled CC may be transmitted/received only through the scheduling CC. A DL ACK/NACK channel (a PHICH in the case of 3GPP LTE(-A)) carrying ACK/NACK for a PUSCH transmitted on the scheduling CC or scheduled CC may be transmitted/received only on the scheduling CC. ACK/NACK for a PDSCH transmitted on the scheduling CC or scheduled CC may be transmitted/received on a UL control channel (a PUCCH in the case of 3GPP LTE(-A)) or a UL data channel (a PUSCH in the case of 3GPP LTE(-A)). As described earlier, according to current 3GPP LTE(-A) standards, the PUCCH may be transmitted/received on a PCC. Here, a PDSCH/PUSCH of a scheduling CC or scheduled CC refers to a PDSCH/PUSCH configured/allocated to be transmitted on a corresponding CC, and ACK/NACK of a scheduling CC or scheduled CC refers to ACK/NACK for data transmitted on a corresponding CC.

In 3GPP LTE-A of a next version (beyond LTE-A), an aggregate of plural CCs present in different frequency bands is considered. Here, different frequency bands may mean different frequency bands having a very wide frequency spacing relative to bandwidth of one CC. In one frequency band, a plurality of CCs each having a very narrow frequency spacing relative to a spacing between the different frequency bands may be present. That is, CCs belonging to different frequency bands refer to CCs, center frequencies of which are separated. If CCs belonging to different frequency bands are aggregated, the UE has a high probability of operating an independent power amplifier per frequency band. If the UE operates an independent power amplifier per frequency band, UL transmission can be efficiently performed even though a single carrier property required for UL transmission is only satisfied with respect to each frequency band. Hereinafter, carrier aggregation using CCs belonging to different frequency bands will be referred to as inter-frequency carrier aggregation and carrier aggregation using only CCs belonging to the same frequency band will be referred to as intra-frequency carrier aggregation.

In a 3GPP LTE(-A) system based on OFDM technology, time when a signal transmitted by the UE arrives at the BS differs according to the radius of a cell, location of the UE in the cell, and mobile speed of the UE. That is, if the BS does not manage a transmission timing of each UE, a transmission signal of a specific UE may cause interference with a transmission signal of another UE, thereby increasing an error rate of a reception signal at the side of the BS. In terms of the BS, since data or signals transmitted by all UEs in a cell should be received within an effective time boundary in order to prevent influence of interference, the BS should appropriately adjust a transmission timing of a UE according to a situation of the UE. Such adjustment is called timing advance maintenance or time alignment maintenance. One method for managing UL time alignment is a random access procedure. That is, through the random access procedure, the BS receives a random access preamble transmitted by the UE and calculates a timing advance (TA) value for advancing or retarding the transmission timing of the UE using information about the received random access preamble. The BS informs the UE of the calculated TA value through a random access response and the UE updates the transmission timing using the TA value. In a legacy system, the random access procedure has been performed only on the PCC. In the case of inter-frequency carrier aggregation, since frequency characteristics differ according to a frequency band, a different TA per frequency band may be provided in terms of UL synchronization. Accordingly, in the case of inter-frequency carrier aggregation, unlike the legacy system in which the random access procedure is performed only on the PCC, the case may occur in which an additional random access procedure may be performed even with respect to an SCC present in a frequency band different from the PCC so that a UL transmission timing per frequency band should be adjusted. Further, even in the same frequency, if antennas of different locations transmit/receive signals using the same frequency, the distance between the antennas transmitting/receiving the signals in the above frequency and a UE varies with the antennas and thus one TA cannot be applied to a UL CC operating in a frequency using the antennas of different locations.

Meanwhile, in TDD, most communication standards up to now consider only an aggregate of plural CCs having the same TDD DL-UL configuration. However, it is desirable to permit a different DL-UL configuration per CC in terms of efficient use of a communication link when difference in UL/DL load per CC and difference in channel state per CC are considered. If different DL-UL configurations are permitted, the number of DL subframes and the number of UL subframes in a prescribed interval (e.g. a radio frame) per CC may differ and ACK/NACK timings configured on a PCC and an SCC, i.e. subframe timings at which ACK/NACK is transmitted on the PCC and the SCC, may differ. For example, in a specific subframe, while an ACK/NACK timing for the PCC may be configured as a UL subframe, an ACK/NACK timing for the SCC may be configured as a DL subframe, or vice versa. In addition, even when CCs having different TDD DL-UL configurations are aggregated, cross-carrier scheduling may be supported. In this case, UL grant and PHICH timings configured on a scheduling CC and a scheduled CC (i.e. DL subframe timings at which a UL grant and a PHICH are transmitted) may differ. For example, a specific subframe may be configured as a DL subframe, which is a UL grant or PHICH timing, with respect to the scheduling CC and as a UL subframe with respect to the scheduled CC, or vice versa. As a method for solving the difference in the UL/DL feedback timings, a method may be considered for redefining feedback transmission for an SCC/scheduled CC such that feedback transmission may be performed at a feedback timing configured on a PCC/scheduling CC. However, feedback timing adjustment of the SCC/scheduled CC to the feedback timing configured on the PCC/scheduling CC is complicated in relationship configuration and may cause an asymmetric operation. Moreover, this method has a high probability of entailing additional feedback delay.

If CCs operating in frequencies in different frequency bands are aggregated, if CCs operating in frequencies using antennas of different locations are aggregated, and/or if CCs having different TDD DL-UL configurations are aggregated, these UL CCs have different TAs according to a frequency characteristic or a UL timing characteristic. To support a plurality of UL TAs, the present invention groups the CCs (hereinafter, CC groups) according to the frequency characteristic or UL timing characteristic and manages a TA per CC group. In other words, according to the present invention, all aggregated CCs are classified into a plurality of CC groups based on frequency bands, TDD DL-UL configurations, and/or antenna locations and one UL anchor CC per CC group is configured. According to the present invention, one UE for which carrier aggregation is configured may have at least a PCC group and, if SCC(s) having a TA different from that of the PCC is present, the UE may have one or more SCC groups together with a PCC group. The PCC group may include at least a PCC and may or may not include an SCC. Each SCC group may include one or more SCCs.

In a PCC group, a PCC becomes a UL anchor CC. In an SCC group, any one of one or more SCCs belonging to the SCC group may be configured as the UL anchor CC. Upon adding an SCC as a serving CC for the UE, information indicating whether the SCC is the UL anchor CC may be transmitted to the UE. Alternatively, information indicating an anchor CC among SCCs configured for the UE may be transmitted to the UE. The BS may indicate whether a normal SCC other than an anchor SCC belongs to a PCC group or an SCC group to the UE. If the normal SCC belongs to the SCC group, the BS may informs the UE of which SCC group the normal SCC belongs to.

In order for the UE to manage a TA per CC group, in an embodiment of the present invention, a random access preamble (hereinafter, RACH preamble) may be independently allocated per UL anchor CC. Then the UE may perform a random access procedure (hereinafter, RACH procedure) per CC group. Hence, according to an embodiment of the present invention, the UE performs the RACH procedure on an SCC as well as a PCC. More specifically, the RACH procedure may be performed through a CC configured as a UL anchor CC (in TDD) or through a DL CC (in FDD) linked to the UL anchor CC. Alternatively, the RACH procedure may be performed through UL transmission (e.g. an RACH preamble, a PUSCH based on a random access response, etc.) using the UL anchor CC and through DL transmission (e.g. a PDCCH order, a random access response, etc.) using the PCC.

As opposed to a legacy wireless system in which the same TA is applied to all UL CCs, different TAs are applied to different CC groups in the present invention. Accordingly, if a PUCCH for all serving CCs is transmitted only on the PCC, the case may occur in which the BS cannot correctly obtain channel state information (CSI) associated with serving CC(s) which does not belong to a PCC group, HARQ feedback, and scheduling request information. Therefore, the present invention proposes an embodiment for transmitting/receiving a PUCCH for CC(s) belonging to each CC group on a UL anchor CC configured in a corresponding CC group.

Namely, according to the present invention, a PCC is used for PUCCH transmission(s) only for a PCC group and an SCC configured as a UL anchor CC is used for PUCCH transmission for an SCC group to which the SCC belongs. Then, the UE transmits UCI associated with serving CC(s) belonging to a PCC group to the BS through a PUCCH of a PCC and transmits UCI associated with serving CC(s) of an SCC group to which an SCC belongs to the BS through a PUCCH of the SCC configured as the UL anchor CC. That is, according to the present invention, the UE may transmit the PUCCH on a CC configured as the UL anchor CC as well as on the PCC and the BS may receive the PUCCH on the SCC as well as on the PCC. A detailed description of characteristics related to ACK/NACK transmission through the PUCCH of the UL anchor CC is as follows.

For ACK/NACK transmission, an implicit PUCCH (format 1a/1b) resource, which is linked to a CCE resource of a UL anchor CC (in TDD) or a DL CC (in FDD) linked to the UL anchor CC, and an additional explicit PUCCH (format 1a/1b/3) resource may be defined on the UL anchor CC. In other words, the explicit and/or implicit PUCCH resources may be reserved on the UL anchor CC. In an embodiment of the present invention, if a UE operating in TDD receives only a PDCCH/PDSCH carrying a specific DL grant (hereinafter, a DL grant PDCCH/PDSCH) for a CC configured as a UL anchor CC, the UE may transmit ACK/NACK information for the DL grant PDCCH/PDSCH to the BS using the implicit PUCCH resource implicitly determined by linkage with an index of a resource unit (e.g. CCE) in the DL grant PDCCH. In this case, the specific DL grant may be DCI which schedules DL transmission using the UL anchor CC, wherein a downlink assignment index (DAI) of the specific DL grant is configured as 1. If a DAI $V^{DL}_{DA1}$ for DL transmission is detected in a specific subframe n, the DAI indicates the number of subframes having PDCCH and PDSCH transmission indicating DL semi-persistent scheduling (SPS) release among a prescribed number of subframe(s) up to the specific subframe n. For example, if the UE receives only a PDCCH carrying DAI set to 1, the UE may transmit ACK/NACK information for a DL grant PDCCH/PDSCH corresponding to the DAI set to 1 to the BS using a PUCCH resource linked to a PDCCH. Meanwhile, in the embodiment of the present invention, if a UE operating in FDD receives only a DL grant PDCCH/PDSCH for a DL CC linked to a UL anchor CC, the UE may transmit ACK/NACK for the DL grant PDCCH/PDSCH to the BS using an implicit PUCCH resource implicitly determined by linkage with the DL grant PDCCH.

A transmit power control (TPC) field in a DL grant PDCCH may be used for PUCCH power control information and ACK/NACK resource selection information. In an embodiment of the present invention, a TPC field is independently utilized per CC group. For example, in TDD, a TPC field included in a specific PDCCH for scheduling a UL anchor CC may be used for power control for PUCCH transmission on the UL anchor CC and TPC fields included in all other PDCCHs for scheduling a CC group to which the UL anchor CC belongs may be used for explicit indication of a PUCCH resource to be used for ACK/NACK transmission for the CC group among PUCCH resources reserved for the UL anchor CC. In this case, the specific PDCCH may be a PDCCH carrying a DAI set to 1. As another example, in FDD, a TPC field included in a PDCCH for scheduling a DL CC linked to a UL anchor CC may be used for power control for PUCCH transmission on the UL anchor CC and TPC fields included in all other PDCCHs for scheduling a CC group to which the UL anchor CC belongs may be used for explicit indication of a PUCCH resource to be used for ACK/NACK transmission for the CC group among PUCCH resources reserved for the UL anchor CC. According to this embodiment, a UL anchor CC of an SCC group, which is an SCC, is different from a conventional SCC in that PUCCH transmit power is controlled by TPC.

As mentioned above, in the present invention, the UL anchor CC is in charge of PUCCH transmission of ACK/NACK and/or CSI for a CC group to which the CC belongs. Accordingly, in the present invention, a UL anchor CC or a DL CC linked to the UL anchor CC is activated most quickly and is deactivated most slowly among all CCs in a CC group to which the UL anchor CC belongs. In the case of cross-carrier scheduling, the BS may configure CCs such that the relationship between a scheduling CC (MCC) and a scheduled CC is formed only in a CC group. In other words, the BS may perform scheduling such that a scheduling CC and a scheduled CC scheduled by the scheduling CC may belong to the same CC group. During cross-carrier scheduling, the BS may configure a UL anchor CC always as the scheduling CC in TDD and configure a DL CC linked to the UL anchor CC always as the scheduling CC in FDD.

Meanwhile, if a scheduled PUSCH is present at a PUCCH transmission timing, that is, if a transmission time of a PUCCH carrying UCI such as ACK/NACK and/or periodic CSI is a subframe to which a PUSCH is allocated, the UCI is transmitted/received by piggybacking the same on the PUSCH. In this case, according to an embodiment of the present invention, the UE transmits UCI for each CC group to the BS only through a PUSCH allocated to one of UL CC(s) in the CC group. That is, if the transmission timing of a PUCCH using a UL anchor CC in a CC group collides with the transmission timing of a PUSCH using one CC in the CC group, the UE drops PUCCH transmission and transmits UCI for the CC group to the BS even on the PUSCH. Even in the case of aperiodic CSI transmission through the PUSCH, the UE may transmit CSI for a target CC of aperiodic CSI reporting to the BS only on a PUSCH allocated to one of UL CC(s) of a CC group to which the target CC belongs. That is, UCI associated with CC(s) belonging to a PCC group is transmitted/received on a PUCCH of a PCC or transmitted/received on a PUSCH of the PCC or a PUSCH of an SCC. UCI associated with CC(s) belonging to an SCC group is transmitted/received on a PUCCH of an SCC configured as a UL anchor CC or transmitted/received on a PUSCH scheduled on an arbitrary SCC.

Figure 7:
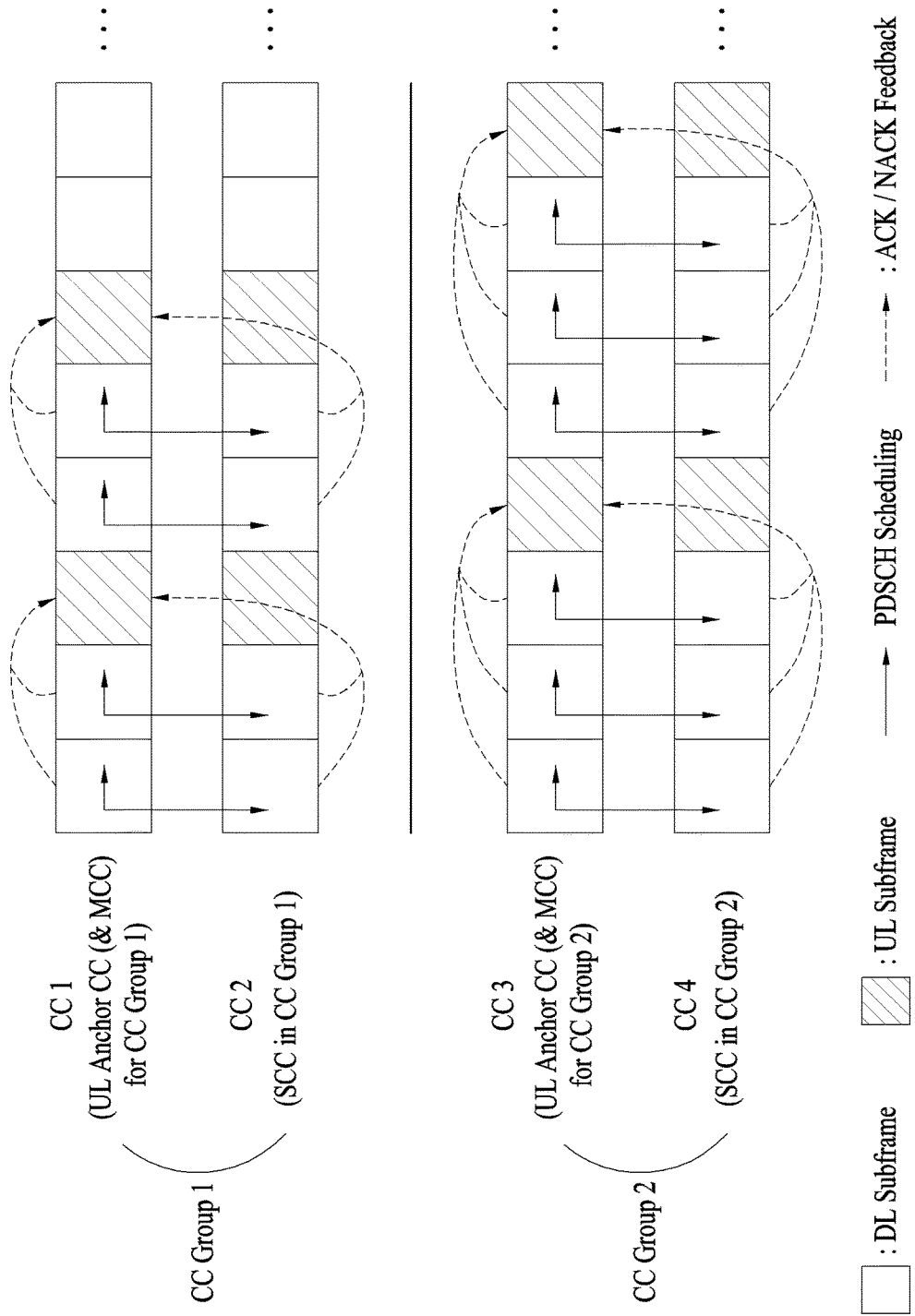
FIGS. 7 and 8 illustrate embodiments of the present invention.
Figure 8:
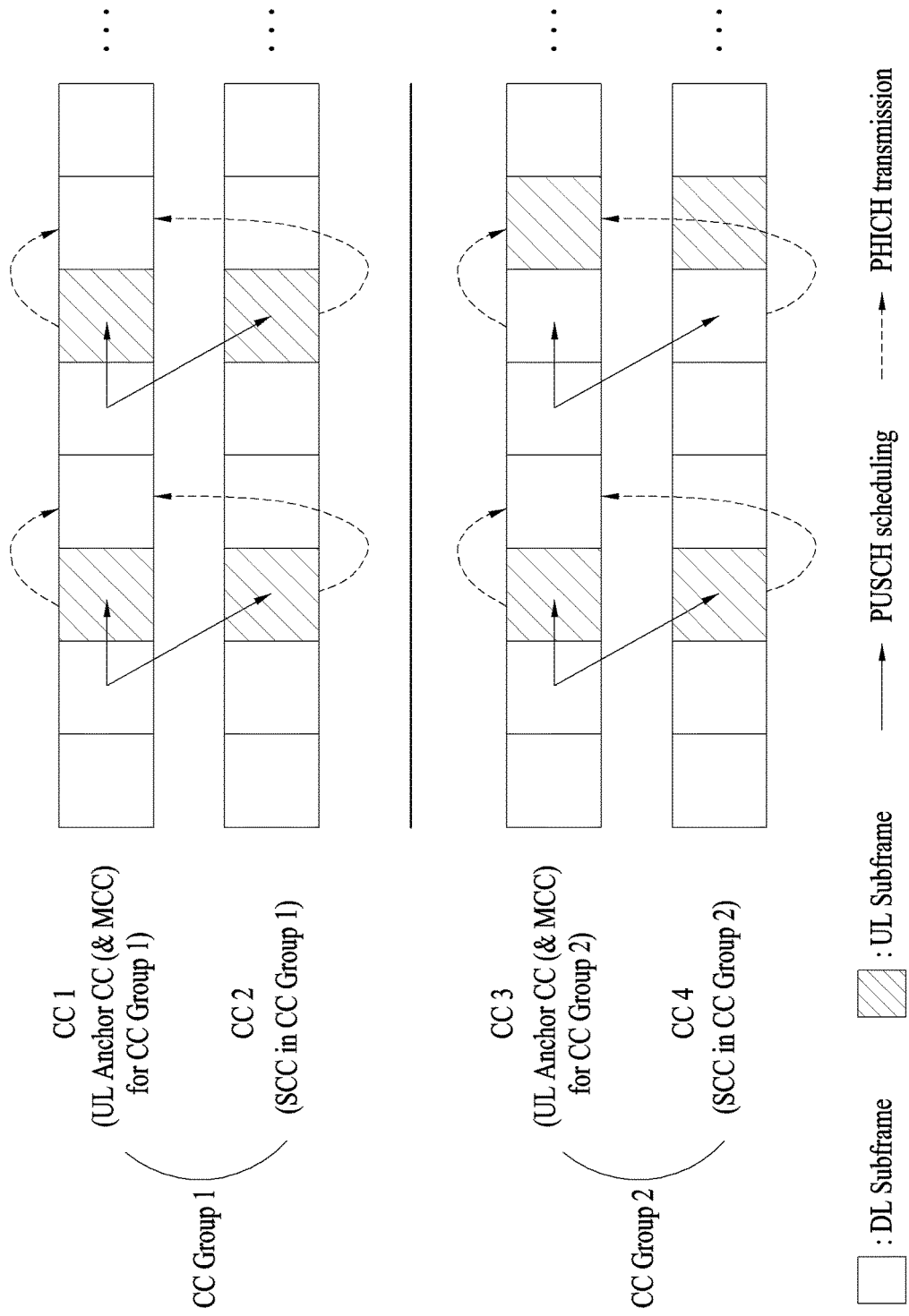

FIGS. 7 and 8 illustrate embodiments of the present invention. Particularly, FIG. 7 illustrates a method for transmitting/receiving a DL grant and ACK/NACK for the DL grant according to an embodiment of the present invention and FIG. 8 illustrates a method for transmitting/receiving a UL grant and ACK/NACK for the UL grant according to an embodiment of the present invention. For reference, it is assumed in FIGS. 7 and 8 that there is no delay between reception of a DL/UL grant, reception/transmission of DL/UL data, and transmission of a DL/UL feedback signal.

Referring to FIGS. 7 and 8, in CC group 1, two DL subframes correspond to one UL subframe and, in CC group 2, three DL subframes correspond to one UL subframe. That is, in CC group 1, a UE transmits ACK/NACK information for DL data received in two DL subframes to a BS in a UL subframe corresponding to the two DL subframes and, in CC group 2, the UE transmits ACK/NACK information for DL data received in three DL subframes to the BS in a UL subframe corresponding to the three DL subframes. A UL anchor CC is configured per CC group. During cross-carrier scheduling, the UL anchor CC may be configured as an MCC carrying DL/UL scheduling information for all or some CCs in a CC group to which the UL anchor CC belongs. In examples illustrated in FIGS. 7 and 8, the UL anchor CC is configured as the MCC.

Referring to FIG. 7, the BS may transmit a DL grant (i.e. PDSCH scheduling) and a PDSCH for the DL grant to the UE in a DL subframe and receive ACK/NACK information for a PDCCH carrying the DL grant and/or a PDSCH scheduled by the PDCCH from the UE in a UL subframe associated to the DL subframe (e.g. a UL subframe a prescribed number of subframes after the DL subframe). The UE according to the present invention transmits ACK/NACK information for the PDCCH or the PDSCH scheduled by the PDCCH to the BS on a CC group basis. Referring to FIG. 7, the UE may transmit ACK/NACK information for PDCCHs and/or PDSCHs received on CC1 and CC2, which are CCs of CC group 1, to the BS through a PUCCH on CCl configured as a UL anchor CC out of CC1 and CC2. If there is a CC to which a PUSCH colliding with a PUCCH transmission timing is allocated, among CCs of CC group 1, the UE may transmit ACK/NACK information regarding CC group 1 to the BS by piggybacking the same on a PUSCH allocated to one CC of CC group 1. Similarly, the UE may transmit ACK/NACK information for PDCCHs and/or PDSCHs received on CC3 and CC4, which are CCs of CC group 2, to the BS through a PUCCH on CC3 configured as a UL anchor CC out of CC3 and CC4. If there is a CC to which a PUSCH colliding with a PUCCH transmission timing is allocated, among CCs of CC group 2, the UE may transmit ACK/NACK information regarding CC group 2 to the BS by piggybacking the same on a PUSCH allocated to one CC of CC group 2.

Referring to FIG. 8, the BS may transmit a UL grant (i.e. PUSCH scheduling) to the UE in a DL subframe and receive a PUSCH according to the UL grant from the UE in a UL subframe associated to the DL subframe (e.g. a UL subframe a prescribed number of subframes after the DL subframe). The BS may transmit a PHICH carrying ACK/NACK for the PUSCH to the UE in a DL subframe associated with a UL subframe in which the PUSCH is received (e.g. a DL subframe a prescribed number of subframes after the UL subframe). The BS according to the present invention transmits ACK/NACK information for the PUSCH to the UE on a CC group basis and the UE receives the ACK/NACK information for the PUSCH from the BS on a CC group basis. Referring to FIG. 8, the BS may transmit ACK/NACK information for PUSCH(s) received on CC1 and CC2, which are CCs of CC group 1, to the UE through a PHICH on CC1 configured as a UL anchor CC out of CCl and CC2 and the UE may receive a PHICH carrying the ACK/NACK information for the PUSCH(s) transmitted using CC(s) of CC group 1 from the BS on CCl configured as an anchor CC of CC group 1. Similarly, the BS may transmit ACK/NACK information for PUSCH(s) received on CC3 and CC4, which are CCs of CC group 2, to the UE through a PHICH on CC3 configured as a UL anchor CC out of CC3 and CC4 and the UE may receive a PHICH carrying the ACK/NACK information for the PUSCH(s) transmitted using CC(s) of CC group 2 from the BS on CC3 configured as an anchor CC of CC group 2.

ACK/NACK transmission timings for DL/UL transmission illustrated in FIGS. 7 and 8 are purely exemplary and may be differently configured according to FDD mode or non-FDD mode and/or according to TDD UL-DL configuration.

Figure 9:
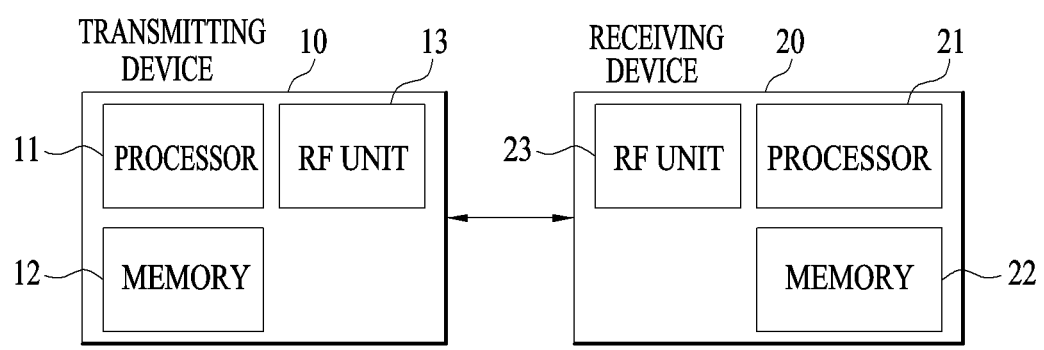
FIG. 9 is a block diagram illustrating elements of a transmitting device 10 and a receiving device 20 for implementing the present invention.

FIG. 9 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23, according to an embodiment of the present invention under control of the processors 11 and 21. The antenna may also be called an antenna port. Each antenna may correspond to one physical antenna or may be configured by a combination of more than one physical antenna element. The signal transmitted from each antenna cannot be further deconstructed by the receiving device 20. An RS transmitted in correspondence to a corresponding antenna defines an antenna viewed from the receiving device 20 and enables the receiving device 20 to perform channel estimation for the antenna, irrespective of whether it is a single radio channel from one physical antenna or a composite channel from a plurality of physical antenna elements including the antenna. In other words, the antenna is defined such that a channel carrying a symbol of the antenna may be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, a BS operates as the receiving device 20 in UL and as the transmitting device 10 in DL. In the embodiments of the present invention, the processor, RF unit, and memory included in the UE will be referred to as a UE processor, a UE RF unit, and a UE memory, respectively, and the processor, RF unit, and memory unit included in the BS will be referred to as a BS processor, a BS RF unit, and a BS memory, respectively.

According to the embodiments of the present invention, the BS processor controls the BS RF unit to transmit a PDCCH, a PDSCH, and a PHICH and the UE processor controls the UE RF unit to receive the PDCCH, the PDSCH, and the PHICH. According to the embodiments of the present invention, the UE processor controls the UE RF unit to transmit a PUCCH and a PUSCH and the BS processor controls the BS RF unit to receive the PUCCH and the PUSCH.

Specifically, the BS processor classifies CCs configured for the UE into a plurality of CC groups based on frequency bands, TDD DL-UL configurations, and/or antenna locations and configures one UL anchor CC per CC group. Then, the CCs configured for the UE, i.e. serving CCs of the UE, may be divided into at least one PCC group and zero or more SCC groups. The BS processor and the UE processor may configure a PCC as a UL anchor CC of a PCC group. The BS processor may configure one SCC per SCC group as a UL anchor CC and control the BS RF unit to transmit information about a UL anchor CC per SCC group. The UE processor may configure a UL anchor CC per SCC group based on information about the UL anchor CC. Upon adding an SCC as a serving CC for the UE, the BS processor may control the BS RF unit to transmit information indicating whether the SCC is the UL anchor CC to the UE. Alternatively, the BS processor may control the BS RF unit to transmit information indicating an anchor CC among SCCs configured for the UE to the UE. Alternatively, the BS processor may control the BS RF unit to transmit information indicating whether a normal SCC other than an anchor SCC belongs to a PCC group or an SCC group to the UE and, if the normal SCC belongs to the SCC group, the BS processor may control the BS RF unit to indicate to which SCC group the normal SCC belongs to the UE.

In order for the UE processor to manage a TA per CC group, in an embodiment of the present invention, a random access preamble (hereinafter, RACH preamble) may be independently allocated per UL anchor CC. Then the UE may perform a random access procedure (hereinafter, RACH procedure) per CC group. Hence, according to an embodiment of the present invention, the UE performs the RACH procedure per CC group. Hence, according to an embodiment of the present invention, the UE processor may perform the RACH procedure on an SCC as well as a PCC. The UE processor may control the UE RF unit to perform the RACH procedure through a CC configured as a UL anchor CC (in TDD) or through a DL CC (in FDD) linked to the UL anchor CC. Alternatively, the UE processor may control the UE RF unit to perform UL transmission (e.g. an RACH preamble, a PUSCH based on a random access response, etc.) to the BS using a UL anchor CC and control the UE RF unit to perform DL transmission (e.g. a PDCCH order, a random access response, etc.) from the BS using the PCC, thereby performing an RACH procedure per CC group.

The UE processor according to the present invention controls the UE RF unit to transmit a PUCCH for CC(s) belonging to each CC group on a UL anchor CC configured for a corresponding CC group and the BS processor controls the BS RF unit to receive the PUCCH for the CC(s) belonging to each CC group on the UL anchor CC configured for the corresponding CC group. The UE processor controls the UE RF unit to transmit UCI associated with serving CC(s) belonging to a PCC group to the BS through a PUCCH of a PCC and controls UE RF unit to transmit the UCI associated with serving CC(s) of an SCC group to which an SCC configured as a UL anchor CC belongs to the BS through a PUCCH of the SCC. The BS processor controls the BS RF unit to receive the UCI associated with the serving CC(s) belonging to the PCC group from the UE through the PUCCH of the PCC and controls the BS RF unit to receive the UCI associated with the serving CC(s) of the SCC group to which the SCC configured as the UL anchor CC belongs from the UE through the PUCCH of the SCC.

In an embodiment of the present invention, if the UE RF unit operating in TDD receives only a PDCCH/PDSCH carrying a specific DL grant (hereinafter, a DL grant PDCCH/PDSCH) for a CC configured as a UL anchor CC, the UE processor may control the UE RF unit to transmit ACK/NACK information for the DL grant PDCCH/PDSCH to the BS using an implicit PUCCH resource implicitly determined by linkage with an index of a resource unit (e.g. a CCE) in the DL grant PDCCH. In this case, the specific DL grant may be DCI which schedules DL transmission using a UL anchor CC, wherein a DAI of the specific DL grant is set to 1. In an embodiment of the present invention, if the UE RF unit operating in FDD receives only a DL grant PDCCH/PDSCH for a DL CC linked to a UL anchor CC, the UE processor may control the UE RF unit to transmit ACK/NACK information for the DL grant PDCCH/PDSCH to the BS using an implicit PUCCH resource implicitly determined by linkage with the DL grant PDCCH.

The BS processor and the UE processor according to an embodiment of the present invention independently use a TPC field per CC group. For example, in TDD, the BS processor may use a TPC field included in a specific PDCCH that schedules a UL anchor CC to perform power control for PUCCH transmission on the UL anchor CC and use TPC fields included in all other PDCCHs that schedule a CC group to which the UL anchor CC belongs to explicitly indicate a PUCCH resource to be used for ACK/NACK transmission for the CC group among PUCCH resources reserved for the UL anchor CC. In this case, the specific PDCCH may be a PDCCH carrying a DAI set to 1. As another example, in FDD, the BS processor may use a TPC field included in a PDCCH that schedules a DL CC linked to a UL anchor CC to perform power control for PUCCH transmission on the UL anchor CC and use TPC fields included in all other PDCCHs that schedule a CC group to which the UL anchor CC belongs to explicitly indicate a PUCCH resource to be used for ACK/NACK transmission for the CC group among PUCCH resources reserved for the UL anchor CC. The UE RF unit receives DCI including the TPC field and transmits the DCI to the UE processor. If the DCI including the TPC field is scheduling information for the UL anchor CC, the UE processor may use a value of the TPC field to determine a PUCCH transmit power on the UL anchor CC and, if the DCI including the TPC field is scheduling information for an SCC other than the UL anchor CC, the UE processor may use the value of the TPC field to determine a PUCCH resource to be used for transmission of ACK/NACK information for a CC group to which the UL anchor CC belongs among PUCCH resources reserved for the UL anchor CC.

In an embodiment of the present invention, the BS processor may most quickly activate or most slowly deactivate a UL anchor CC or a DL CC linked to the UL anchor CC among all CCs in a CC group to which the UL anchor CC belongs. In the case of cross-carrier scheduling, the BS processor may perform scheduling such that a scheduling CC and a scheduled CC scheduled by the scheduling CC belong to the same CC group. During cross-carrier scheduling, the BS processor may configure a UL anchor CC always as the scheduling CC in TDD and configure a DL CC linked to the UL anchor CC always as the scheduling CC in FDD.

Meanwhile, if a scheduled PUSCH is present at a PUCCH transmission timing, that is, if a transmission time point of a PUCCH carrying UCI such as ACK/NACK and/or periodic CSI is a subframe to which a PUSCH is allocated, the UE processor may control the UE RF unit to transmit the UCI by piggybacking the same on the PUSCH and the BS processor may control the BS RF unit to receive the PUSCH and decode the UCI from the PUSCH. In this case, according to an embodiment of the present invention, the UE processor may control the UE RF unit to transmit UCI for each CC group to the BS only through a PUSCH allocated to one of UL CC(s) in a corresponding CC group and the BS processor may determine the UCI received on the PUSCH of one CC to be UCI for a CC group to which the CC belongs. Even in the case of aperiodic CSI transmission through the PUSCH, the UE processor may control the UE RF unit to transmit CSI for a target CC of aperiodic CSI reporting to the BS only on a PUSCH allocated to one of UL CC(s) of a CC group to which the target CC belongs and the BS processor may determine CSI reporting received on the PUSCH of one CC to be CSI for a CC group to which the CC belongs. That is, UCI associated with CC(s) belonging to a PCC group is transmitted/received on a PUCCH of a PCC or transmitted/received on a PUSCH of the PCC or a PUSCH of an SCC. UCI associated with CC(s) belonging to an SCC group is transmitted/received on a PUCCH of an SCC configured as a UL anchor CC or transmitted/received on a PUSCH scheduled on an arbitrary SCC.

According to the present invention described hereinabove, UL CCs on which the UE and the BS operate in different frequencies and/or UL CC(s) on which the UE and the BS operate in a frequency using antennas of different locations can be aggregated and a plurality of time synchronizations for one UE can be efficiently managed. In addition, according to the present invention, different time synchronizations may be applied to UL CCs having different frequency characteristics. Furthermore, DL/UL control information can be efficiently transmitted/received in a carrier aggregation environment and a cross-carrier scheduling environment.

The detailed description of the preferred embodiments of the present invention has been given hereinabove to enable those skilled in the art to implement and practice the invention. Although the invention has been described with reference to exemplary embodiments, those skilled in the art will appreciate that various modifications and variations can be made in the present invention without departing from the spirit and scope of the invention described in the appended claims. Accordingly, the invention should not be limited to the specific embodiments described herein, but should be accorded the broadest scope consistent with the principles and novel features disclosed herein.

The embodiments of the present invention are applicable to a BS, a UE, or other devices in a wireless communication system.

What is claimed is:

1. A method for transmitting, by a base station to a user equipment configured with a plurality of serving cells, downlink data, the method comprising:
   transmitting, by the base station, a physical downlink control channel (PDCCH) carrying a downlink grant for a scheduled cell, which is one of the plurality of serving cells, through a scheduling cell among the plurality of serving cells; and
   transmitting, by the base station, a physical downlink shared channel (PDSCH) carrying the downlink data through the scheduled cell according to the downlink grant,
   wherein the user equipment is configured at least a primary cell (PCell) group and a secondary cell (SCell) group,
   wherein the PCell group is configured with a PCell and zero or more SCells among the plurality of serving cells, and the SCell group is configured with one or more SCells not belonging to the PCell group among the plurality of serving cells, and
   wherein the scheduled cell belongs to the PCell group when the scheduling cell belongs to the PCell group, and the scheduled cell belongs to the SCell group when the scheduling cell belongs to the SCell group.

2. The method according to claim 1, further comprising:
   receiving, by the base station, a physical uplink control channel (PUCCH) carrying acknowledgement/negative acknowledgement (ACK/NACK) information for the SCell group from the user equipment, wherein the PUCCH is received on an SCell configured as an anchor SCell among the one or more SCells belonging to the SCell group.

3. The method according to claim 2, wherein:

the PUCCH is received using a PUCCH resource associated with a control channel element (CCE) of the PDCCH, when the scheduling cell belongs to the SCell group and when the scheduled cell is the anchor SCell, and the PUCCH is received using a PUCCH resource determined based on a transmit power control (TPC) field included in the PDCCH, when the scheduling cell belongs to the SCell group and when the scheduled cell is an SCell other than the anchor SCell among the one or more SCells belonging to the SCell group.

4. The method according to claim 2, wherein the anchor SCell is a scheduling cell for at least one SCell in the SCell group.

5. A base station for transmitting downlink data to a user equipment configured with a plurality of serving cells, the base station comprising:

a radio frequency (RF) unit, and a processor configured to:

control the RF unit to transmit a physical downlink control channel (PDCCH) carrying a downlink grant for a scheduled cell, which is one of the plurality of serving cells, through a scheduling cell among the plurality of serving cells, and control the RF unit to transmit a physical downlink shared channel (PDSCH) carrying the downlink data through the scheduled cell according to the downlink grant, wherein the user equipment is configured at least a primary cell (PCell) group and a secondary cell (SCell) group, wherein the PCell group is configured with a PCell and zero or more SCells among the plurality of serving cells, and the SCell group is configured with one or more SCells not belonging to the PCell group among the plurality of serving cells, and wherein the scheduled cell belongs to the PCell group when the scheduling cell belongs to the PCell group, and the scheduled cell belongs to the SCell group when the scheduling cell belongs to the SCell group.

6. The base station according to claim 5, wherein:

the processor is configured to control the RF unit to receive a physical uplink control channel (PUCCH) carrying acknowledgement/negative acknowledgement (ACK/NACK) information for the SCell group from the user equipment, and the PUCCH is received on an SCell configured as an anchor SCell among the one or more SCells belonging to the SCell group.

7. The base station according to claim 6, wherein:

the PUCCH is received using a PUCCH resource associated with a control channel element (CCE) of the PDCCH, when the scheduling cell belongs to the SCell group and when the scheduled cell is the anchor SCell, and the PUCCH is received using a PUCCH resource determined based on a transmit power control (TPC) field included in the PDCCH, when the scheduling cell belongs to the SCell group and when the scheduled cell is an SCell other than the anchor SCell among the one or more SCells belonging to the SCell group.

8. The base station according to claim 6, wherein the anchor SCell is a scheduling cell for at least one SCell in the SCell group.

9. A method for receiving, by a user equipment configured with a plurality of serving cells, downlink data, the method comprising:

receiving, by the user equipment, a physical downlink control channel (PDCCH) carrying a downlink grant for a scheduled cell, which is one of the plurality of serving cells, through a scheduling cell among the plurality of serving cells; and receiving, by the user equipment, a physical downlink shared channel (PDSCH) carrying the downlink data through the scheduled cell according to the downlink grant, wherein the user equipment is configured at least a primary cell (PCell) group and a secondary cell (SCell) group, wherein the PCell group is configured with a PCell and zero or more SCells among the plurality of serving cells, and the SCell group is configured with one or more SCells not belonging to the PCell group among the plurality of serving cells, and wherein the scheduled cell belongs to the PCell group when the scheduling cell belongs to the PCell group, and the scheduled cell belongs to the SCell group when the scheduling cell belongs to the SCell group.

10. The method according to claim 9, further comprising:

transmitting, by the user equipment, a physical uplink control channel (PUCCH) carrying acknowledgement/ negative acknowledgement (ACK/NACK) information for the SCell group, wherein the PUCCH is transmitted on an SCell configured as an anchor SCell among the one or more SCells belonging to the SCell group.

11. The method according to claim 10, wherein:

the PUCCH is transmitted using a PUCCH resource associated with a control channel element (CCE) of the PDCCH, when the scheduling cell belongs to the SCell group and when the scheduled cell is the anchor SCell, and the PUCCH is transmitted using a PUCCH resource determined based on a transmit power control (TPC) field included in the PDCCH, when the scheduling cell belongs to the SCell group and when the scheduled cell is an SCell other than the anchor SCell among the one or more SCells belonging to the SCell group.

12. The method according to claim 10, wherein the anchor SCell is a scheduling cell for at least one SCell in the SCell group.

13. The method according to claim 10, further comprising:

adjusting uplink transmission timing for the PCell group based on a random access procedure using the PCell; and adjusting uplink transmission timing for the SCell group based on a random access procedure using the anchor SCell.

14. A user equipment for receiving downlink data, wherein the user equipment is configured with a plurality of serving cells, the user equipment comprising:

a radio frequency (RF) unit, and a processor configured to:

control the RF unit to receive a physical downlink control channel (PDCCH) carrying a downlink grant for a scheduled cell, which is one of the plurality of serving cells, through a scheduling cell among the plurality of serving cells, and control the RF unit to receive a physical downlink shared channel (PDSCH) carrying the downlink data through the scheduled cell according to the downlink grant, wherein the user equipment is configured at least a primary cell (PCell) group and a secondary cell (SCell) group, wherein the PCell group is configured with a PCell and zero or more SCells among the plurality of serving cells, and the SCell group is configured with one or more SCells not belonging to the PCell group among the plurality of serving cells, and wherein the scheduled cell belongs to the PCell group when the scheduling cell belongs to the PCell group, and the scheduled cell belongs to the SCell group when the scheduling cell belongs to the SCell group.

15. The user equipment according to claim 14, wherein:

the processor is further configured to control the RF unit to transmit a physical uplink control channel (PUCCH) carrying acknowledgement/negative acknowledgement (ACK/NACK) information for the SCell group, and the PUCCH is transmitted on an SCell configured as an anchor SCell among the one or more SCells belonging to the SCell group.

16. The user equipment according to claim 15, wherein:

the PUCCH is transmitted using a PUCCH resource associated with a control channel element (CCE) of the PDCCH, when the scheduling cell belongs to the SCell group and when the scheduled cell is the anchor SCell, and the PUCCH is transmitted using a PUCCH resource determined based on a transmit power control (TPC) field included in the PDCCH, when the scheduling cell belongs to the SCell group and when the scheduled cell is an SCell other than the anchor SCell among the one or more SCells belonging to the SCell group.

17. The user equipment according to claim 15, wherein the anchor SCell is a scheduling cell for at least one SCell in the SCell group.

18. The user equipment according to claim 15, wherein the processor is configured to adjust uplink transmission timing for the PCell group based on a random access procedure using the PCell and adjust uplink transmission timing for the SCell group based on a random access procedure using the anchor SCell.

* * * * *